Nov. 21, 1944. J. MOSS 2,363,258
CUTTING DEVICE
Filed Oct. 28, 1943
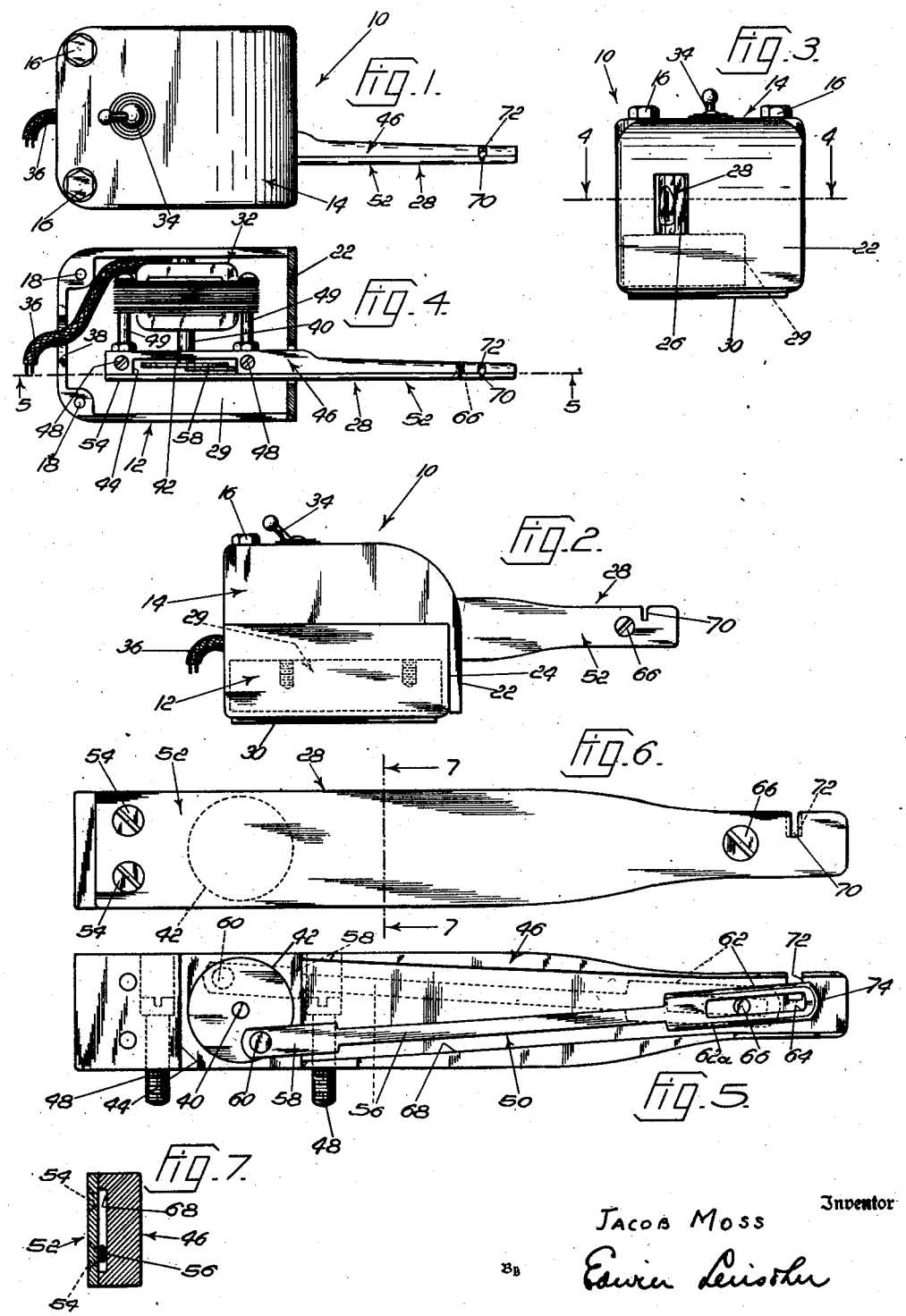
Inventor
JACOB MOSS
By Edwin Leistner
Attorney Patented Nov. 21, 1944

2,363,258

UNITED STATES PATENT OFFICE 2,363,258

CUTTING DEVICE

Jacob Moss, Plainfield, N. J.

Application October 28, 1943, Serial No. 507,970

12 Claims. (Cl. 26—7)

This invention relates to cutting devices and more particularly to a power operated device for cutting threads in connection with the finishing of dresses, sweaters and other garments.

In the garment industry, after sewn or knitted garments, for example, dresses or sweaters, are substantially completed, it is necessary to remove from such garments numerous loose ends of thread or yarn, and this is usually done by means of a hand operated scissors, which is a tedious and slow operation. One object of the present invention is to provide a power operated cutter which is particularly well adapted for use in cutting the loose ends of threads or yarns from dresses, sweaters and other garments.

Another object of the invention is to provide a cutter of the character described which enables the garment finisher to use both hands in performing the operation of cutting loose ends of threads or yarns from the garments. In this connection, a more specific object of the invention is to accomplish this result by means of a power operated device which may be either mounted in fixed position or which may be movable so that it can be easily moved from one place to another as needed.

Another object of the invention is the provision in a cutting device of a knife which is so constructed and arranged and which is so operated as to reciprocate transversely of the thread or yarn presented thereto and also to move toward and away from said thread or yarn in the direction of the thickness thereof to engage the yarn or thread for cutting the same when the latter is presented for action thereon by said knife.

A further object of the invention is the provision in a power operated cutter of a knife and a housing for said knife which completely encloses the same and substantially totally eliminates the element of personal danger, and injury to the garments.

A further object of the invention is to provide a power operated cutter which in general is of improved construction and operation, said cutter being of simple and inexpensive construction and easy to use by the garment finisher or other operator.

The above and other objects, features and advantages of my invention will be fully understood from the following description, reference being had to the accompanying illustrative drawing.

In the drawing:

Fig. 1 is a top view of a power operated cutting device embodying the present invention;

Fig. 2 is a side view in elevation of said cutting device;

Fig. 3 is an end view in elevation of said cutting device;

Fig. 4 is a sectional view on the line 4—4 of Fig. 3;

Fig. 5 is a view, on a larger scale, of parts of the device, as seen on the line 5—5 of Fig. 4, certain other parts of the device being omitted, for the purpose of illustration;

Fig. 6 is a side view in elevation of the knife housing;

Fig. 7 is a sectional view on the line 7—7 of Fig. 6.

Referring now to the drawing in detail, the power operated cutter 10 embodying the present invention comprises a casing or frame which is preferably formed of a metal casting and includes the separable bottom and upper parts 12 and 14, respectively. Said casing parts are secured to each other in any suitable way, as by removable screws 16 which pass through openings in casing part 14 and are received in threaded openings 18 in casing part 12. Casing part 14 is provided with a wall portion 22, preferably integral therewith, which closes one end 24 of the lower casing part 12 and which is provided with an opening 26 through which the knife housing 28 projects. Preferably, the casing is weighted by means of a metal block 29 which is fixed in casing part 12. A rubber or other antifriction pad 30 is secured to the bottom of the casing. By reason of the provision of the weighting block 29, or its equivalent, the cutting device may be of small size, for example, small enough to be handled and moved about with one hand, and yet is heavy enough to remain in position during the use of the device for cutting the threads or yarns without being fixably secured to the table bench or other support on which the device is mounted when in use. It will be understood, however, that if desired, the device may be secured to such support and that it is within the scope of the present invention to omit the weighting block 29 or its equivalent. However, as shown block 29 also provides a base for the cutter and the housing therefor.

An electric motor 32 is mounted in the casing and is preferably secured in position in lower casing part 12. A switch 34 for controlling the circuit of the motor is mounted in the top of casing part 14, and an electric cord 36 extends into said casing through an opening 38 formed in an end wall of lower casing 12 and is connected to said switch and motor for supplying current thereto. The rotary shaft 40 of electric motor 32 projects into the knife housing 28 and has fixed thereto at its outer end a rotary member, here shown as a disk 42 which is positioned in a recess 44 formed in the bar 46 which constitutes one part of the housing 28. Said housing bar 46 is fixed in the casing in any suitable way, being here shown as secured to the block or base 29 by screws 48. The motor 32 may be secured in position in casing part 12 by fastening the frame of said motor to bar 46 by screws 49. Thus as shown, the housing 28 is fixed in the casing and extends therefrom.

The cutter member or knife 50 is positioned in and extends logitudinally of housing 28, being completely enclosed in said housing by said housing bar 46 and by a removable housing plate 52 which is secured to said bar in any suitable way as by screws 54. Said cutter member 50 comprises a longitudinally extending flat rod 56 having an end portion 58 pivotally secured by a pin 60 to the rotary member 42 eccentrically of the axis of rotation of said rotary member. Said cutter member is provided at its cutter end with a longitudinal knife or cutting edge 62 and with a longitudinal slotted portion 64 disposed laterally of said knife edge 62. Said slotted portion 64 pivotally engages a pin 66 constituted by a screw which engages housing parts 46 and 52 near the forward end of the housing and thus also serves to hold said housing parts together. The housing bar 47 is provided with a longitudinal extending recess 68 in which the cutter member 50 is positioned, said recess being closed by housing plate 54. It will be understood that pin 66 constitutes a fulcrum member for the cutting member 50 and that said cutter member is held against substantial movement longitudinally of the fulcrum member 66 by the inner surface of housing plate 52 and the confronting inner surface of housing member 46. Housing 28 is provided with a plurality of slots 70 and 72 which provide access to the cutting edge 62 of the cutting member 50 by a thread, yarn or other work to be cut by said cutter member. Said plate 54 is thin so that the thread can be cut close to the part of the garment from which the thread is cut. Slots 70 and 72 are of different widths to accommodate threads or yarns of different thicknesses.

In view of the above description, it will be understood that the cutter member 50 is mounted in housing 28 for reciprocation longitudinally of said housing, whereby the cutting edge 62 of said cutting member is movable transversely of the slots 70 and 72 and transversely of the thread or yarn positioned in either of said slots for engagement by said cutting edge, and that said cutter member 50 is also mounted for oscillatory movement in housing 28 in such manner that the cutting edge 62 is oscillated and is moved toward and away from said thread or yarn positioned in either of said slots for engagement by said cutting edge. Accordingly, in using the cutting device of the present invention, it is unnecessary for the operator to force the thread or yarn against the knife or cutting edge 62, but on the contrary, it is merely necessary for the thread or yarn to be positioned in the slot and held therein by the operator while the cutting edge moves transversely of said thread or yarn. During such movement, said cutting edge also moves toward the yarn and quickly engages the same in the cutting operation. Further, it will be understood that by reason of the compound reciprocatory and oscillatory movement of the cutting edge of the cutting member, the cutting of the thread or yarn presented to said cutting edge is quickly accomplished as soon as the thread is positioned in the slot. It will be noted that the fulcrum of the cutting member 50 is nearer one end of the latter than the other end thereof, so that the path of oscillation of said first mentioned end is shorter than the path of oscillation of said other end, and that the cutting edge 62 is in the region of said first mentioned end of the cutting member. Thus, the cutting edge is oscillated through a short path and has a rapid cutting action on the thread or yarn presented thereto.

If desired, the cutting member 50 may be provided with a duplicate cutting edge indicated at 62a which may be utilized when the cutting edge 62 becomes dull, by reversing the cutting member 50 so that the positions of said cutting edges 62 and 62a are reversed whereby cutting edge 62a is located for engaging the thread or yarn positioned in slot 70 or slot 72. For this purpose, pin 60 is preferably removable, and it will be understood that access to the cutting member for reversing or removing the same is easily obtained by removing the top part 14 of the casing and the knife housing plate 52. Also, as here shown, the cutting edge extends around the end of the cutting member, being curved around said end as indicated at 74.

It will be understood that the cutting device may be used for cutting threads other than the threads of garments. For example, said devices may be used at packaging tables for cutting tying cords or strings. Thus, as used in the claims the term thread is intended to cover cords, strings or similar elements as well as threads and yarns. Also, while I have shown and described the preferred embodiment of my invention, it will be understood that the latter may be embodied otherwise than as herein shown or described and that in the embodiment herein illustrated or described, certain changes in the details of construction and in the arrangement of parts may be made without departing from the invention as defined by the appended claims.

Having thus described my invention, what I claim and desire to secure by Letters Patent is:

1. In a thread cutter comprising a frame carrying an electric motor, a knife housing projecting from said frame, a knife mounted for movement in said housing, and means operatively connecting said knife to said motor for reciprocation of said knife in said housing; means imparting an ocillatory motion to said knife in conjunction with said reciprocation thereof, said last mentioned means comprising a fulcrum member carried by said housing and pivotally engaged by said knife between the opposite ends thereof, said fulcrum member extending transversely of the direction of said reciprocation and said knife being movable transversely of said fulcrum during said reciprocation.

2. In a thread cutter, a longitudinally extending knife member having a longitudinal cutting edge and a longitudinal slot, a fulcrum member extending through said slot and mounting said knife member for pivotal movement thereon, a rotary member operatively connected to said knife member for moving the latter longitudinally and for pivotally moving said knife member on said fulcrum, and means for actuating said rotary member.

3. In a thread cutter, a rotary member, a longitudinal knife member connected at one end thereof to said rotary member eccentrically of the axis of rotation thereof, said knife member having a longitudinal cutting edge near the other end thereof and a longitudinal slot disposed laterally of said cutting edge, a fulcrum member extending through said slot and mounting said knife member for pivotal and longitudinal movement, said knife member being movable longitudinally and pivotally in response to the rotation of said rotary member, and means for actuating said rotary member.

4. In a thread cutter, a rotary member, a longitudinal knife member connected at one end thereof to said rotary member eccentrically of the axis of rotation thereof, said knife member having a longitudinal cutting edge near the other end thereof and a longitudinal slot disposed laterally of said cutting edge, a fulcrum member extending through said slot and mounting said knife member for pivotal and longitudinal movement, said knife member being movable longitudinally and pivotally in response to the rotation of said rotary member, and means for actuating said rotary member, and a housing enclosing said knife and having a slot providing access to said cutting edge.

5. In a thread cutter comprising a frame carrying an electric motor, a knife housing projecting from said frame, a knife mounted for movement in said housing, and means operatively connecting said knife to said motor for reciprocation of said knife in said housing; means for imparting an oscillatory motion to said knife in conjunction with said reciprocation thereof, said last mentioned means comprising a fulcrum member carried by said housing and pivotally engaged by said knife between the opposite ends thereof, said fulcrum member extending transversely of the direction of said reciprocation and said knife having a longitudinal slot through which said fulcrum member extends.

6. In a thread cutter comprising a frame carrying an electric motor, a knife housing projecting from said frame, a knife mounted for movement in said housing, and means operatively connecting said knife to said motor for reciprocation of said knife in said housing; means for imparting an oscillatory motion to said knife in conjunction with said reciprocation thereof, said last mentioned means comprising a fulcrum member carried by said housing and pivotally engaged by said knife between the opposite ends thereof, said fulcrum member extending transversely of the direction of said reciprocation and said knife having a longitudinal slot through which said fulcrum member extends, said knife having a longitudinal cutting edge disposed laterally of said slot and said housing enclosing said knife and having a slot providing access to said cutting edge.

7. A cutter comprising a frame carrying an electric motor, a rotary member actuated by said motor, a longitudinal knife member connected at one end thereof to said rotary member eccentrically of the axis of rotation of said rotary member, guide means extending from said frame and positioned at opposite sides of said knife member adjacent thereto, said knife member having a longitudinal cutting edge and a slotted portion spaced longitudinally from said end of the knife member and disposed laterally of said cutting edge, and a fulcrum member carried by said guide means and projecting through said slotted portion of the knife member for mounting the latter for pivotal movement and for longitudinal movement whereby said knife member is reciprocated and oscillated in response to the rotation of said rotary member.

8. In a power operated cutting tool, a knife member having a cutting edge, a housing in which said knife member is mounted for movement, and a rotary member for moving said knife member in said housing, said housing enclosing said knife member and having a slot providing access to said cutting edge.

9. In a power operated cutting tool, a knife member having a cutting edge, a housing in which said knife member is mounted for movement, and a rotary member for moving said knife member in said housing, said housing enclosing said knife member and having a plurality of slots of different widths providing access to said cutting edge by work of different dimensions, projected into said slots, respectively, for engagement with said cutting edge.

10. In a power operated cutting tool, a casing having an electric motor therein, a bar fixed to said casing and projecting therefrom, said bar having a longitudinally extending recess in one side thereof, a longitudinal knife member positioned in said recess and movable longitudinally and transversely thereof, means operated by said electric motor for moving said knife member longitudinally and transversely of said recess, and a longitudinal plate connected to said bar over the recessed side thereof and forming with said bar a housing for said knife.

11. A cutter comprising a longitudinally extending housing, a longitudinal cutter member mounted for reciprocation and oscillation in the same plane in said housing, said housing having a top opening and said cutter member having a longitudinal cutting edge confronting said opening, fulcrum means in said housing in pivotal engagement with said cutting member between the opposite ends thereof, said cutter member being constructed and arranged to be movable transversely of its fulcrum during reciprocation of said cutter member, and means operatively connected to said cutter member for oscillating the same about its fulcrum and for simultaneously reciprocating said cutter transversely of said fulcrum.

12. A cutter comprising a longitudinal member having a longitudinal cutting edge, fulcrum means mounting said member between the opposite ends thereof for pivotal movement about said fulcrum, said fulcrum being located nearer one end of said member than the other end thereof, said member being constructed and arranged to move transversely of said fulcrum as well as to turn thereon, and a rotary member connected to said other end of said longitudinal member for reciprocating the latter transversely of said fulcrum and for simultaneously oscillating said longitudinal member on said fulcrum, said cutting edge being positioned in such relation to said fulcrum that its path of oscillation is shorter than the path of oscillation of said other end of said longitudinal member.

JACOB MOSS.